(12) United States Patent
Krygowski et al.

(10) Patent No.: US 6,829,627 B2
(45) Date of Patent: Dec. 7, 2004

(54) FLOATING POINT UNIT FOR MULTIPLE DATA ARCHITECTURES

(75) Inventors: Christopher A. Krygowski, Lagrangeville, NY (US); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 09/764,595

(22) Filed: Jan. 18, 2001

(65) Prior Publication Data

US 2002/0095451 A1 Jul. 18, 2002

(51) Int. Cl.$^7$ .......................... G06F 15/00; G06F 13/00
(52) U.S. Cl. .................. 708/204; 708/200; 708/160
(58) Field of Search ................................ 708/200, 204, 708/495, 503, 206, 170; 341/94; 712/222

(56) References Cited

U.S. PATENT DOCUMENTS

| | | | | |
|---|---|---|---|---|
| 4,594,679 A | * | 6/1986 | George et al. | 708/503 |
| 5,191,335 A | * | 3/1993 | Leitherer | 341/94 |
| 5,687,106 A | | 11/1997 | Schwarz et al. | |
| 5,687,359 A | * | 11/1997 | Smith, Sr. | 712/222 |
| 5,825,678 A | * | 10/1998 | Smith | 708/495 |
| 5,889,980 A | * | 3/1999 | Smith, Jr. | 712/222 |
| 6,044,454 A | | 3/2000 | Schwarz et al. | |
| 6,055,554 A | * | 4/2000 | Schwarz | 708/503 |

OTHER PUBLICATIONS

IEEE Standard for Binary Floating–Point Arithmetic, The Institute of Electrical and Electronics Engineers, Inc., Copyright 1985.

Hexadecimal–Floating–Point Instructions, IBM Enterprise Systems Architecture/390, Principles of Operation, Eighth Edition, Jul. 2001.

\* cited by examiner

*Primary Examiner*—Chat C. Do
(74) *Attorney, Agent, or Firm*—Lynn Augspurger; Cantor Colburn LLP

(57) ABSTRACT

A computer system with a floating point unit ("FPU") for supporting multiple floating point architectures is provided. The system includes a format converter for converting between the internal data flow format and the architected external data types by multiplexing the exponent and system includes a floating point unit having an internal data-flow according to an internal floating point format for performing floating point operations. The internal format has a number of exponent bits and a number of fraction bits sufficient to support each of the floating point architectures. The format converters the exponent value of each floating point architecture into the internal floating point format so that data operand of any of the floating point architectures point is converted into the internal floating point format for subsequent arithmetic operations, and the result of the operation is converted back into the original floating point architecture for output.

17 Claims, 1 Drawing Sheet

FLOATING POINT UNIT FOR MULTIPLE DATA ARCHITECTURES

BACKGROUND OF THE INVENTION

The present invention relates to computer systems and architecture, and more particularly, to a computer system having a floating point unit ("FPU") for supporting multiple floating point architectures.

Computer software is typically designed to utilize one of several floating point architectures, such as either IEEE Binary Floating Point Standard 754-1985 ("IEEE-754"), or IBM®-S/390® hexadecimal floating point standard. See "Enterprise Systems Architecture/390 Principles of Operation" (Order No. SA22-7201-02, IBM®, 1994); and "IEEE standard for binary floating-point arithmetic, ANSI/IEEE Std 754-1985."

Software applications that are designed for one floating point architecture may not be compatible with another floating point architecture. However, it is often desirable to run the same application on different hardware platforms supporting different floating point architectures, or to use data generated by an application on one platform with a different application on another platform that supports a different floating point architecture. Moreover, it is often desirable to run applications that are based on different floating point architectures on a single machine. These needs are particularly relevant to multi-tasking environments where task switching between different applications may require using different floating point architectures.

The representation of a floating point number is different between IBM®-S/390® hexadecimal based architecture and IEEE-754 compliant binary architecture. In an IBM®-S/390® hexadecimal architecture format, a floating point number, $N_{HA}$, is represented by $$N_{HA}=(-1)^S \times 16^{(Exponent-Hex\ Bias)} \times 0.\text{Fraction} \quad (1)$$

The hexadecimal Exponent field is 7 bits in length for all formats and the Fraction field is 24 bits in length for Short format, 56 bits in length for Long format or 112 bits in length for Extended format. In an IEEE binary architecture format a floating point number, $N_{BA}$, is represented by $$N_{BA}=(-1)^S \times 2^{(Exponent-Binary\ Bias)} \times 1.\text{Fraction} \quad (2)$$

The binary Exponent field is 8, 11 or 15 bits in length and the Fraction field is 24, 53 or 113 bits in length for the Single, Double or Double Extended formats, respectively. The values of the exponent biases for the two architectures are also different. In particular, the value of the hexadecimal architecture Exponent Bias is 64 for Short, Long and Extended formats. The value of the binary architecture Exponent Bias is 127 for the Single format, 1023 for the Double format and 16,383 for the Double Extended format.

It is desirable to create an FPU for a computer system that supports multiple floating point architectures. Multiple floating point architecture support should be provided without resorting to duplication of floating point hardware and without sacrificing performance. In addition, such an architecture should be transparent to the greatest extent possible in order to simplify the interaction between the user and the system.

Accordingly, there is a need for a single FPU that supports both a hexadecimal based IBM®-S/390® hexadecimal architecture and an IEEE-754 compliant binary architecture. It is also desirable to create a single floating point unit that supports both architectures efficiently, without sacrificing performance. It would be inefficient in terms of hardware usage to implement two floating point units, one for each format. Some previous attempts converted all binary operands into a hexadecimal-like format and operated internally on just one format. However, performance was sacrificed in these implementations because two additional cycles were required to format binary input into hexadecimal, and then reformat a hexadecimal result into binary. Other previous attempts optimized the data-flow for binary, and converted only the hexadecimal operands into the binary format. However, this penalized hexadecimal operands with format conversion cycles.

SUMMARY OF THE INVENTION

An embodiment of the invention is directed to a computer system with a floating point unit ("FPU") for supporting multiple floating point architectures. Multiple floating point architectures are supported by an FPU with an internal data-flow format that accommodates formats of each architecture. The system includes a format converter for converting between the internal data flow format and the architected external data types by multiplexing the exponent.

The system includes a floating point unit having an internal data-flow according to an internal floating point format for performing floating point operations. The internal format has a number of exponent bits sufficient to support each of the plurality of floating point architectures and the internal format has a number of fraction bits sufficient to support each of the plurality of floating point architectures.

The system also includes format converters for converting the exponent value of each floating point architecture into the internal floating point format so that a data operand of any of the floating point architectures input to the floating point unit is converted into the internal floating point format for subsequent arithmetic operations, and the result of the operation is converted back into the original floating point architecture by converting the exponent value of the result from the internal floating point format into the original floating point architecture.

DETAILED DESCRIPTION OF THE INVENTION

Figure 1:
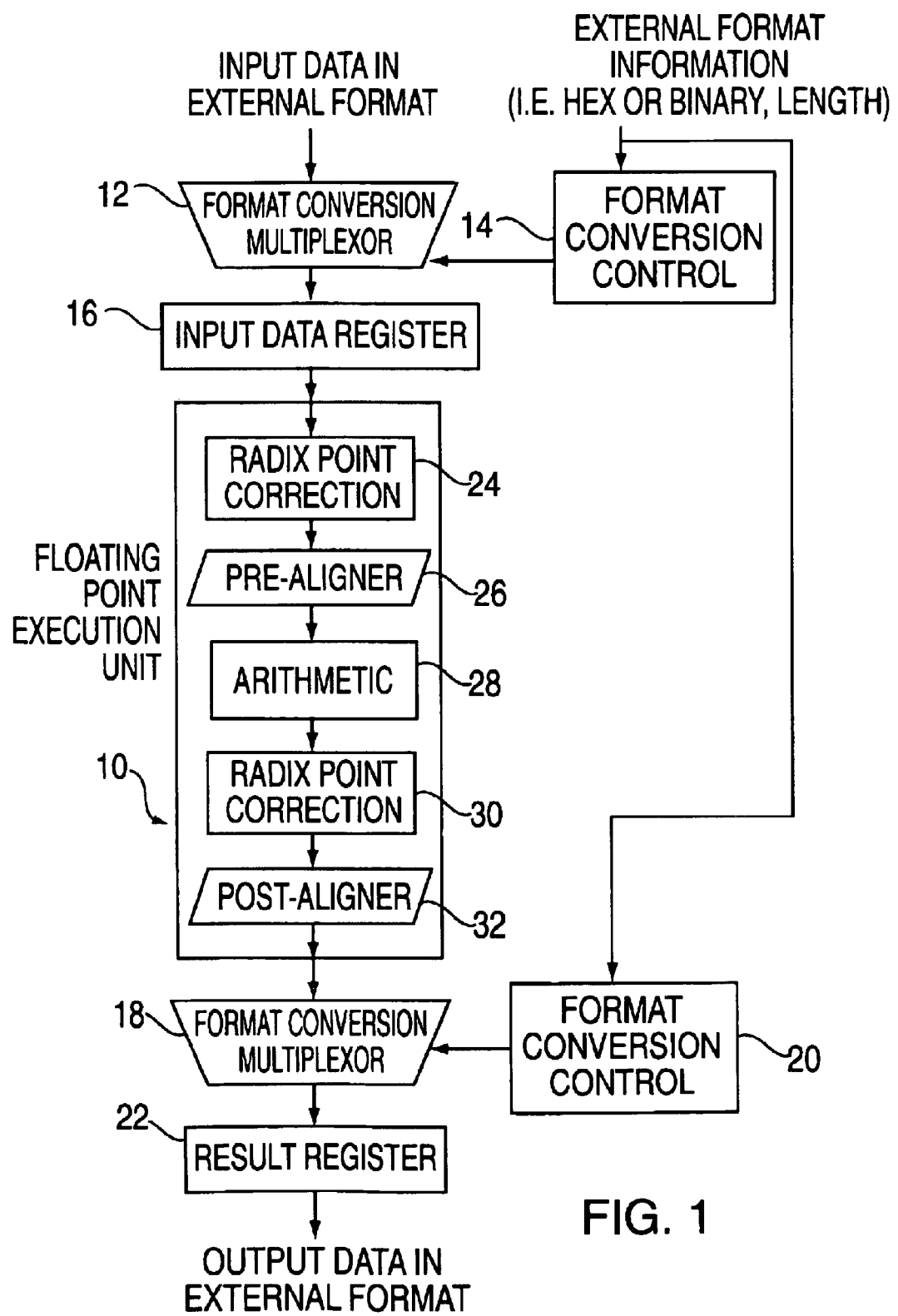
FIG. 1 provides an overview of the data-flow through a floating point unit of a computer system in accordance with an embodiment of the present invention.

FIG. 1 provides an overview of the data-flow through the floating point unit of a computer system embodying the present invention. This exemplary embodiment supports both IBM®-S/390® and IEEE-754 architectures. The system includes a floating point execution unit ("FPU") 10, a localized input format conversion multiplexor ("IFCM") 12 for receiving the input data in external format, and input format conversion control ("IFCC") 14 for receiving external format information corresponding to architecture type and data format length. The IFCC 14 controls the IFCM 12 to cause the IFCM to output the floating point data to an input data register ("IDR") 16 in an intermediate masked format. The IDR 16 receives the intermediate data for transfer to the FPU 10. The FPU 10 internally processes the floating point data through a single data-flow path, as indicated by the single arrows within the FPU 10. The processed floating point data is received from the FPU 10 by an output format conversion multiplexor ("OFCM") 18.

Output format conversion control ("OFCC") 20 uses the external format information of architecture type and data format length to control the OFCM 18 to output the data to a result register ("RR") 22 in a format corresponding to the format of the original external data. Thus, output data in the original external format becomes available from the RR 22.

The FPU 10 uses a single execution data-flow path to execute both IEEE-754 and IBM®-S/390® based floating point instructions. Thus, the data-flow path supports two different floating point architectures. A shared internal binary architecture is used with two different biases to simplify the conversion process for both of the supported external architectures. The format conversion process to and from the internal binary based formats does not adversely impact performance.

The internal formats corresponding to the supported external architected formats are listed below. The internal floating point data format corresponding to the hexadecimal external format is $$N_{HI} = (-1)^S \times 2^{(Exponent-32,768)} \times 0.\text{Fraction} \quad (3)$$

and the internal floating point data format corresponding to the binary external format is $$N_{BI} = (-1)^S \times 2^{(Exponent-32,767)} \times 1.\text{Fraction} \quad (4)$$

where the Exponent and Fraction fields of the internal format are 16 and 56 bits in length, respectively. The format conversion that takes place from the external format to the internal format requires no additional delay and minimal hardware. This format conversion takes place as the data is received into the IDR 16 of the FPU 10. The multiplexing that is performed to obtain the fraction at the IFCM 12 can be utilized to efficiently implement this format conversion without incurring additional clock cycles.

The exponent conversion from external format to internal format accounts for the difference in the biases, as well as for the difference in the exponent bases. The required conversion can be derived for Binary Architected Format to the Binary Internal Format as follows. $X_{ba}$ represents the value of X in a binary architected format and $X_{bi}$ the value of X in a binary internal format. Then, $$X_{ba} = X_{bi} \quad (5)$$

Thus, $$(-1)^{X_{ba}(sign)} \times 2^{(X_{ba}(exp)-\text{Architected Binary Bias})} \times 1.X_{ba}(\text{fract}) = (-1)^{X_{b1}(sign)} \times 2^{(X_{bi}(exp)-32,767)} \times 1.X_{b1}(\text{fract}) \quad (6)$$

Equating like parts of Equation (6) yields:

$$X_{ba}(\text{sign}) = X_{b1}(\text{sign}) \quad (7)$$

$$X_{ba}(\text{fraction}) = X_{bi}(\text{fraction}) \quad (8)$$

$$X_{ba}(\exp) - \text{Architected Binary Bias} = X_{bi}(\exp) - 32,767 \quad (9)$$

and $$X_{b1}(\exp) = X_{ba}(\exp) - \text{Architected Binary Bias} + 32,767 \quad (10)$$

The Architected Binary Exponent Bias is in the form of $2^{(n-1)}-1$, where n is the length of the external exponent field. In particular, n=8, 11 or 15 for short, long or extended data formats, respectively. The internal Binary Exponent Bias is in the form of $2^{(m-1)}-1$ where m is the length of the internal exponent field. In this embodiment, m=16 bits and the corresponding internal binary bias is $2^{(16-1)}-1=32,767$. The Binary Exponent conversion that is required can be derived as follows.

$$X_{b1}(\exp) = X_{ba}(\exp) - \text{Architected Binary Bias} + \{2^{(m-1)}-1\} \quad (11)$$

$$X_{bi}(\exp) = X_{ba}(\exp) + \{2^{(m-1)}-1\} - \{2^{(n-1)}-1\} \quad (12)$$

and $$X_{b1}(\exp) = X_{ba}(\exp) + 2^{(m-1)} - 2^{(n-1)} \quad (13)$$

Similarly, the architected Hexadecimal Exponent Bias is in the form of $2^{(n-1)}$, where n=7 bits. The internal Hexadecimal Exponent Bias is in the form of $2^{(m-1)}$, where m=16. However, the Hexadecimal Architected Exponent is an exponent for base 16 and the Base of the internal FPU (reference numeral 10 in FIG. 1) data-flow is base 2. Thus, the external hexadecimal exponent and bias must be multiplied by 4 since $16^{(exponent)} = 2^{(4 \times exponent)}$. The Hexadecimal Exponent conversion that is required can be derived as follows. $X_{ha}$ represents the value of X in a hexadecimal architected format and $X_{hi}$ the value of X in a hexadecimal internal format. Then, $$X_{ha} = X_{h1} \quad (14)$$

Thus, $$(-1)^{X_{ha}(sign)} \times 16^{(X_{ha}(exp)-64)} \times 0.X_{ha}(\text{fract}) = (-1)^{X_{hi}(sign)} \times 2^{(X_{hi}(exp)-32,768)} \times 0.X_{hi}(\text{fract}) \quad (15)$$

$$(-1)^{X_{ha}(sign)} \times 2^{(4 \times X_{ha}(exp)-256)} \times 0.X_{ha}(\text{fract}) = (-1)^{X_{hi}(sign)} \times 2^{(X_{hi}(exp)-32,768)} \times 0.X_{hi}(\text{fract}) \quad (16)$$

Equating like parts of Equation (16) yields:

$$X_{ha}(\text{sign}) = X_{hi}(\text{sign}) \quad (17)$$

$$X_{ha}(\text{fract}) = X_{hi}(\text{fract}) \quad (18)$$

$$4 \times X_{ha}(\exp) - 256 = X_{hi}(\exp) - 32,768 \quad (19)$$

and $$X_{hi}(\exp) = 4 \times X_{ha}(\exp) + 2^{(m-1)} - 2^{(n+1)} \quad (20)$$

It should be noted that the expression $\{2^{15} - 2^X\}$, where X<15 is equal to $2^{14} + 2^{13} + 2^{12} + 2^{11} + \ldots + 2^X$. When this value is represented as a 16 bit binary number, the most significant bit is a 0 since X is a non-negative integer. Subsequent bits of lower significance are 1's up to and including bit number X+1. The remaining bits of lower significance are zeros. For example, the expression $\{2^{15} - 2^7\}$ is equivalent to the binary number 0111111110000000.

As seen above, the format conversion process requires that the value of the external exponent be added to the adjustment term which is in the form $\{2^{15} - 2^X\}$. If we perform this addition in binary, we note that this addition has an interesting property. The most significant bit of the external exponent is of the value $2^X$ because the external exponent is X+1 bits in length. If the most significant bit of the external exponent is a 1, then there is a carry out of that bit position and ripples all the way to the most significant bit of the result. The binary result will have the most significant bit on if the most significant bit of the external input is on. The subsequent 15−X bits will be active if the most significant bit of the external exponent is not on. The remaining X bits will simply be the least significant X bits of the external exponent. Therefore, the exponent conversion from binary external format to binary internal format is given by the following expression.

$$\text{Internal Exponent(0)} = \text{Architected Exponent(0)} \quad (21)$$

Internal Exponent(1:15−(n−1))=(NOT Architected

Exponent(0))||(NOT Architected(0))|| ... ||(NOT Architected Exponent(0))) (22)

Internal Exponent(15−(n−1):15)=Architected Exponent(1:n) (23)

where n is the length of the architected exponent format.

As noted in the conversion equations for the architected hexadecimal exponent above, it can be seen that the exponent format conversion from hexadecimal architected to internal is also the same process. However, since the external hexadecimal exponent is a base 16 exponent, it needs to be multiplied by four or left shifted by 2 positions to convert it to a binary exponent. The exponent format conversion for hexadecimal is given by the following expression.

Internal Exponent(0)=Architected Exponent(0) (24)

Internal Exponent(1:7)=(NOT Architected Exponent(0))||(NOT Architected(0))|| ... ||(NOT Architected Exponent(0)) (25)

Internal Exponent(8:15)=Architected Exponent(1:6)||'00' (26)

Note that the sign bits and fractions do not need any conversions and are equivalent in either internal or architected format.

The format conversion from internal to external takes place in the final stage of the pipeline just before the result register. The format conversion process is simply the reverse of the process that was performed to convert to the internal format. The process is achieved by controlling the result register input multiplexing. The selection is defined as follows.

Architected Binary Exponent(0)=Internal Exponent(0) (27)

Architected Binary Exponent(1:n)=Internal Exponent(15−(n−2):15) (28)

and

Architected Binary Fraction(0:y−1)=Internal Fraction(1:y) (29)

Also,

Architected Hexadecimal Exponent(0)=Internal Exponent(0) (30)

Architected Hexadecimal Exponent(1:6)=Internal Exponent(8:13) (31)

and

Architected Hexadecimal Fraction(0:y−1)=Internal Fraction(0:y−1) (32)

where y is the length of the architected fraction field.

As also shown in FIG. 1, the FPU 10 receives floating point data from the IDR 16, and then implements input radix point correction ("IRPC") 24 followed by normalization by the pre-aligner ("PRA") 26. The arithmetic unit ("AU") 28 then performs the desired arithmetic manipulations of the data in internal binary format in a manner well known to those of ordinary skill in the pertinent art. The resulting data is received in internal binary format for output radix point correction ("ORPC") 30. Intermediate data is then received by the post-aligner ("POA") 32 for subsequent transfer from the FPU 10 to the OFCM 18.

It should be noted that the POA 32 is designed to normalize on hexadecimal digit boundaries when operating on hexadecimal data. There is no special requirement for the pre-normalization process of the PRA 26 since it is controlled by the internal exponent which is already on a hexadecimal boundary. Also, the exponent logic of the AU 28, designed to handle floating point addition alignment, is capable of handling two different biases and locations of implied radix points. This complication does not impact the cycle time and is only a slight hardware area increase since the exponent data-flow is much smaller than the fraction data-flow.

An advantage of a Floating Point Unit of the invention is that the physical hardware requirements are reduced over units having separate data paths for multiple data architectures.

Another advantage of a Floating Point Unit of the invention is that the time delay for conversion of data into the internal architecture from at least one of the supported external architectures is reduced over units that require conversion of the fractional portion of an external architecture.

A further advantage of a Floating Point Unit of the invention is that the cost of the unit having a single data path is less than the cost would be for the additional hardware required to implement multiple data paths.

Another advantage of a Floating Point Unit of the invention is that the space requirement of the unit having a single data path is less than that of the additional hardware required to implement multiple data paths.

An additional advantage of a Floating Point Unit of the invention is that the power usage of the unit having a single data path is less than that of the additional hardware required to implement multiple data paths.

A further advantage of a Floating Point Unit of the invention is that the cost of the unit that does not require conversion of the fractional portion of external architecture data into an internal architecture is less than the cost would be to produce hardware fast enough to compensate for the time delay required for conversion of the fractional portion of external architecture data into an internal architecture.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A computer system for supporting a plurality of floating point architectures, each floating point architecture having at least one format, the system comprising:

a floating point unit having art internal data-flow according to an internal floating point format for performing floating point operations in the internal format, wherein the internal format has a number of exponent bits which is at least the minimum number required to support each of the plurality of floating point architectures and the internal format has a number of fraction bits which is at least the minimum number required to support each of the plurality of floating point architectures; and a converter for converting an exponent value corresponding to each one of the plurality of floating point architectures into the internal floating point format such that an operand of any one of the plurality of floating point architectures input to the floating point unit is converted into the internal floating point format by multiplexing the exponent valve for operation by the floating point unit, and the result of the operation is converted back into the one of the plurality of floating point architectures by converting an exponent value corresponding to the internal floating point format into the one of the plurality of floating point architectures, wherein said converting into the internal floating point format occurs without incurring additional clock cycles when said of the plurality or floating point architectures is binary and said convening into the internal floating point format occurs without incurring additional clock cycles when said one of the plurality of floating point architecture is hexadecimal.

2. The computer system of claim 1, wherein the fraction bits corresponding to each of the plurality of floating point architectures are used by the floating point unit in an unconverted state.

3. The computer system of claim 1, wherein the plurality of floating point architectures include IBM®-S/390® hexadecimal floating point architecture and IEEE-754 binary floating point architecture.

4. The computer system of claim 3, wherein the converter:
   determines a sign bit; and
   normalizes a resulting binary floating point number according to at least one of IBM®-S/390® and IEEE-754 normalization modes.

5. The computer system of claim 3, wherein the internal floating point format is a binary format that has a 16 bit exponent biased by 32,768, a sign bit, and a 56 bit fraction.

6. The computer system of claim 1, wherein the plurality of floating point architectures includes a binary architected format and an hexadecimal architected format, and the internal format is a binary internal format.

7. The computer system of claim 6, wherein the binary internal format has a common predetermined fraction type corresponding to both of the hexadecimal and the binary architected formats.

8. The computer system of claim 7, wherein the numbers represented in the binary internal format corresponding to each of the hexadecimal architected format and the binary architected format, respectively, each have predetermined bias types that differ in the locations of the implied radix points.

9. The computer system of claim 8, wherein the binary internal format has a nonzero positive integer number M of exponent bits and a bias equal to $2^{(M-1)}-1$, where M is the length of the internal exponent field.

10. The computer system of claim 1, wherein the plurality of floating point architectures includes a binary architected format and a hexadecimal architected format, the internal format is a binary internal format, and the converter comprises:
    a first converter portion that converts the hexadecimal architected format to the binary internal format, and converts the binary architected format to the binary internal format; and
    a second converter portion that converts the binary internal format into the binary architected format, and converts the binary internal format into the hexadecimal architected format.

11. The computer system of claim 10, wherein the first converter portion comprises an input format conversion multiplexor and input format conversion control, and the second converter portion comprises an output format conversion multiplexor and output format conversion control.

12. A floating point unit for supporting a first floating point architecture and a second floating point architecture, the first and second floating point architectures each having at least one format, the unit comprising:
    an internal floating point format compatible with both the first and second floating point architectures, and sharing the fraction bits and sign bit with both of the floating point architectures;
    a first converter to convert an operand of the first floating point architecture type to the internal floating point format by multiplexing the exponent bits of the operand, and to convert an operand of the second floating point architecture type to the internal floating point format by multiplexing the exponent bits of the operand, wherein said first converter operates without incurring additional clock cycles when said first floating point architecture type is binary, said first converter operates without incurring additional clock cycles when said first floating point architecture type is hexadecimal, said first convener operates without incurring additional clock cycles when said second floating point architecture type is binary, and said first convertor operates without, incurring additional clock cycles when said second floating point architecture type is hexadecimal;
    a floating point unit having an internal data-flow for the internal floating point format that supports the converted data of both the first and second floating point architectures, and that performs floating point operations on data formatted in the internal floating point format by the first converter; and
    a second converter to convert data of the internal floating point format into data of the first floating point architecture by multiplexing the exponent bits of the operand, and to convert data of the internal floating point format into data of the second floating paint architecture by multiplexing the exponent bits of the operand.

13. The floating point unit of claim 12, wherein the data in the internal floating point format is directly converted into data of the first floating point architecture by the second third converter with no additional delay, and wherein data in the internal floating point format is directly converted into data of the second floating point architecture by the second converter with no additional delay.

14. The floating point unit of claim 12, wherein the internal floating point format has a minimum nonzero positive number of exponent bits, N, to support both first and second floating point architectures.

15. The floating point unit of claim 12, wherein the internal floating point format has a single fraction type corresponding to the fraction portions of both first and second floating point architectures.

16. The floating point unit of claim 12, wherein the internal format has the same fraction type as both of the first and second floating point architectures.

17. A method for processing data corresponding to a plurality of floating point architectures, comprising:
    determining a type of a floating point architecture;
    converting the exponent of the data corresponding to the determined architecture into an internal floating point format by:
        correcting the radix point location of the exponent data, and pre-aligning the corrected exponent data, wherein said converting is performed by a multiplexor for multiplexing the exponent data without incuring additional clock cycles when said determined architecture is binary and said converting is performed by the multiplexor without incurring additional clock cycles when said determined
    performing arithmetic computations on the converted data; re-converting the exponent of the computation data by;
    re-correcting the radix point location of the exponent of the computed data, and
    post-aligning the re-corrected exponent of the computed data; and outputting the re-converted data to thereby provide floating point data corresponding to the original floating point architecture without incurring a delay beyond that required to compute the resulting output in the internal floating point format.

* * * * *